United States Patent
Lin et al.

(10) Patent No.: US 10,965,202 B2
(45) Date of Patent: Mar. 30, 2021

(54) SLIDE APPARATUS

(71) Applicant: TOYO Automation Co. Ltd., Tainan (TW)

(72) Inventors: Tsung-Te Lin, Tainan (TW); Kun-Cheng Tseng, Tainan (TW)

(73) Assignee: TOYO Automation Co. Ltd., Tainan (TW)

( * ) Notice: Subject to any disclaimer, the term of this patent is extended or adjusted under 35 U.S.C. 154(b) by 43 days.

(21) Appl. No.: 16/202,364

(22) Filed: Nov. 28, 2018

(65) Prior Publication Data
US 2020/0106352 A1   Apr. 2, 2020

(30) Foreign Application Priority Data

Sep. 27, 2018   (TW) .................... 107134183

(51) Int. Cl.
*H02K 41/03*   (2006.01)
*H02K 41/02*   (2006.01)
*H02K 5/18*    (2006.01)
*H02K 11/01*   (2016.01)

(52) U.S. Cl.
CPC ............. *H02K 41/031* (2013.01); *H02K 5/18* (2013.01); *H02K 11/0141* (2020.08); *H02K 41/02* (2013.01)

(58) Field of Classification Search
CPC ........ H02K 41/031; H02K 11/01; H02K 5/18; H02K 41/00; H02K 41/02; H02K 41/025; H02K 41/03; H02K 41/033; H02K 41/0356; H02K 11/0141; B60L 2200/26
USPC ......... 310/12.09, 12.01, 12.02, 12.03, 12.04, 310/12.05, 12.06, 12.07, 12.08, 12.11, 310/12.12, 12.13, 12.14, 12.15, 12.21, 310/12.22, 12.24, 12.29
See application file for complete search history.

(56) References Cited

U.S. PATENT DOCUMENTS

| | | | |
|---|---|---|---|
| 2003/0108255 A1* | 6/2003 | Teramach | F16C 29/063 384/45 |
| 2006/0049700 A1* | 3/2006 | Moriyama | H02K 41/03 310/12.06 |

\* cited by examiner

*Primary Examiner* — Quyen P Leung
*Assistant Examiner* — Alexander A Singh
(74) *Attorney, Agent, or Firm* — Alan D. Kamrath; Karin L. Williams; Mayer & Williams PC (57) ABSTRACT

A slide apparatus includes a track body, at least one primary module, and a slider provided therein with a secondary module. The track body defines a recessed space therein, and the primary module is installed in the recessed space. The slider is slidably mounted on the track body and has a housing located in the recessed pace of the track body. The housing is provided with at least one channel in which the secondary module is located. The channel of the housing, which opens out at a bottom opening facing to a bottom of the track body, serves as a jig to facilitate the secondary module formed integrally with the housing of the slider. The secondary module works with the primary module to constitute a linear motor, which enables the slider to move linearly along the track body.

9 Claims, 8 Drawing Sheets

SLIDE APPARATUS

BACKGROUND OF THE INVENTION

1. Field of the Invention

The present invention relates to a slide apparatus and, more particularly, to a slide apparatus that employs a linear motor as a mechanical power source.

2. Description of the Related Art

Conventional slide devices or electric cylinders, which are widely used in industrial machines and generally employ a motor to drive a screw shaft, generally include a track body, a linear rail mounted on the track body, a sliding block disposed on the rail, and a sliding carrier coupled to the sliding block and provided with a loading plate. When the motor drives the screw shaft to rotate, the sliding carrier together with the loading plate is driven to move linearly along the track body under the guidance of the linear rail. However, due to the screw shaft behaving like a cantilever beam, there will be problems with cumulative tolerances, and vibration may occur. Thus, the parallelism and positional repeatability of the conventional slide devices are not good.

To mitigate the above-mentioned problems, a slide device employing a linear motor as a mechanical power source has been developed to increase the positional repeatability and accuracy of linear motion without suffering vibration of cantilever beam structures. Furthermore, since there is no screw shaft existing in the slide device, the maximum static friction force at the moment of starting the motor can be reduced, so that the slide device can be moved more smoothly. For conventional linear motors, jigs are required in manufacturing the movers or rotors. Thus, the production efficiency of the linear motors is limited by the number of jigs. One disadvantage of a conventional linear motor is that fasteners, such as bolts, are required to fix a mover onto a supportive body thereof. With this design, acceleration or braking of the sliding carrier may cause breakage of the fasteners on the mover, thus reducing the life span of the slide device.

Furthermore, for conventional motor-driven slide devices, the volume and weight of a device is large due to a bulky rail used in the device. Thus, the force exerted by a motor to overcome the inertia of the device is relatively large, which may lead to lower precision on the motion performance of the device, especially in a multi-axis application. For conventional linear motors applied in slide devices, one disadvantage is that, when a linear motor is operated at a high load, the temperature of the device driven by the motor may rise significantly.

BRIEF SUMMARY OF THE INVENTION

Thus, an objective of the present invention is to provide a slide apparatus, which can be manufactured more efficiently and is robust so that its service life can be increased, and furthermore, which can reduce the temperature rise, and the height and width of the apparatus compared to conventional slide devices.

To achieve this and other objectives, a slide apparatus of the present invention includes a track body, at least one primary module, and a slider in which a second module is provided. The track body has two side walls and a bottom formed between the side walls. A recessed space is formed in the track body and between the side walls and bottom. The at least one primary module is received in the recessed space of the track body. The slider is mounted on the track body and moveable along the track body. The slider has a housing located in the recessed space of the track body and defining at least one channel therein. The channel includes a bottom opening facing to the bottom of the track body. The at least one secondary module is formed integrally in the channel of the housing of the slider. The secondary module works with the primary module to constitute a linear motor, enabling the slider to move linearly along the track body.

According to one aspect of the embodiment, the secondary module is constructed of at least one set of coils enclosed in a body formed by an adhesive, and the primary module includes a base plate fixed on the bottom of the track body and a plurality of magnets provided on the base plate. The set of coils is received in the channel of the housing of the slider, and the adhesive is filled in the channel, so that the set of coils is formed integrally with the housing of the slider.

In a preferred form, the housing of the slider has two opposite walls each provided with a plurality of radiating fins thereon. Each radiating fin has a first side and a second side opposite to the first side, and each of the first and second sides is configured as a bevel side, a curved side, a toothed side or a wavy side.

In a preferred form, the two side walls of the track body are spaced apart in a transverse direction, and each side wall of the track body includes an inner surface provided with rail element extending in a longitudinal direction perpendicular to the transverse direction and defining an elongated recess. The housing of the slider has an upper portion and a lower portion. The upper portion has two opposite lateral sections each defining a groove in an outer surface thereof, and each groove is opposite to the elongated recess of a respective rail element to form a first passage. The upper portion defines two second passages each corresponding to a respective groove thereof. A ball chain constructed of a plurality of balls is fitted through a respective first passage and a respective second passage.

One advantage of the present invention is that the slide apparatus employs a pair of rail elements embedded in the side walls of the track body, which allows the height and width of the apparatus to be significantly reduced while maintaining the load capacity and accuracy of conventional slide devices. Furthermore, the lateral walls of the housing provided with the radiating fins can significantly reduce the temperature rise of the slide apparatus, and can serve as an excellent electromagnetic barrier.

The present invention will become clearer in light of the following detailed description of illustrative embodiments of this invention described in connection with the drawings.

DESCRIPTION OF THE DRAWINGS

The illustrative embodiment may best be described by reference to the accompanying drawings where.

DETAILED DESCRIPTION OF THE INVENTION

A slide apparatus according to the preferred teachings of the present invention is shown in FIGS. 1 through 7 of the drawings and generally designated 10. The slide apparatus 10 generally includes a track body 12, at least one primary module 14, and a slider assembly 16 in which at least one second module 18 is provided. The track body 12 has two side walls 20 and a bottom 22. The side walls 20 are spaced apart in a transverse direction, and the bottom 22 is formed between the side walls 20, thus defining a recessed space 24 (see FIG. 2) extending in a longitudinal direction, which is perpendicular to the transverse direction, between the side walls 20 and, the bottom 22. Each side wall 20 of the track body 12 defines at its inner surface a groove 26 extending in the longitudinal direction to be embedded with a rail element 28 that defines an elongated recess 30 (see FIG. 4). Furthermore, a cableveyor (cable carrier) 32 can be installed at a location adjacent to one of the side walls 20 of the track body 12 so that cables or conduits (not shown) used for the slide apparatus can be protected. Since the cableveyor 32 is a prior art, detailed description therefor is omitted here.

The at least one primary module 14 (commonly known as "stator") is mounted in the recessed space 24 of the track body 12 and fixed on the bottom 22 of the track body 12. In this embodiment, there are three primary modules 14 employed in the slide apparatus 10. The primary module 14 includes a base plate 34 fixed on the bottom 22 of the track body 12, and a plurality of permanent magnets 36 provided on the base plate 34. In this embodiment, each primary module 14 includes eight permanent magnets 36 which are arranged linearly along the longitudinal direction such that the magnetic poles thereof alternate in orientation. The number of the primary modules 14 installed in the slide apparatus 10 depends on the length of the track body 12, and thus, in one embodiment, the primary modules 14 can be adjusted in number.

The slider assembly 16 is mounted on the track body 12 and can be driven to move along the track body 12. In this embodiment, the slider assembly 16 generally includes a slider 38 and a cover 42. The slider 38 has a housing 44 on which a platform 46 is formed. The platform 46 has a width in the transverse direction greater than the housing 44 (see FIG. 2), such that the housing 44 is received in the hollow space 24 of the track body 12 while the platform 46 formed on top of the housing 44 is located above the track body 12. The housing 44 has an upper portion 48 and a lower portion 50 (see FIG. 5). The upper portion 48 has two opposite lateral sections 52 (see FIG. 2), and a groove 54 is formed in an outer surface 53 of each lateral section 52 and extending in the longitudinal direction (see FIG. 6). Each groove 54 is opposite to the elongated recess 30 of a respective rail element 28 and both form a first straight passage with a circular cross section. Furthermore, the upper portion 48 defines two second straight passages 56, each of which corresponds to a respective groove 54 thereof. The slide apparatus 10 may further include a pair of closed-loop ball chains 58, each of which is constructed of a plurality of balls 60 and can be fitted through a respective first straight passage, which are formed by an elongated recess 30 and a groove 54, and a respective second straight passage 56. In addition, a passage connector 62 is provided at each of two opposite ends of each lateral section 52 of the housing 44 to connect one of the first straight passages with a corresponding second straight passage 56 so that a closed-loop passage can be formed. Fasteners 64 can be used to fix the passage connectors 62 onto the upper portion 48 of the housing 44. More specifically, each passage connector 62 defines a curved passage 66 capable of communicating with a first straight passage and a corresponding second straight passage (see FIG. 6). As such, two curved passages 66, a first straight passage, and a corresponding second straight passage 56 constitute a closed-loop passage, which can receive a ball chain 58.

Figure 1:
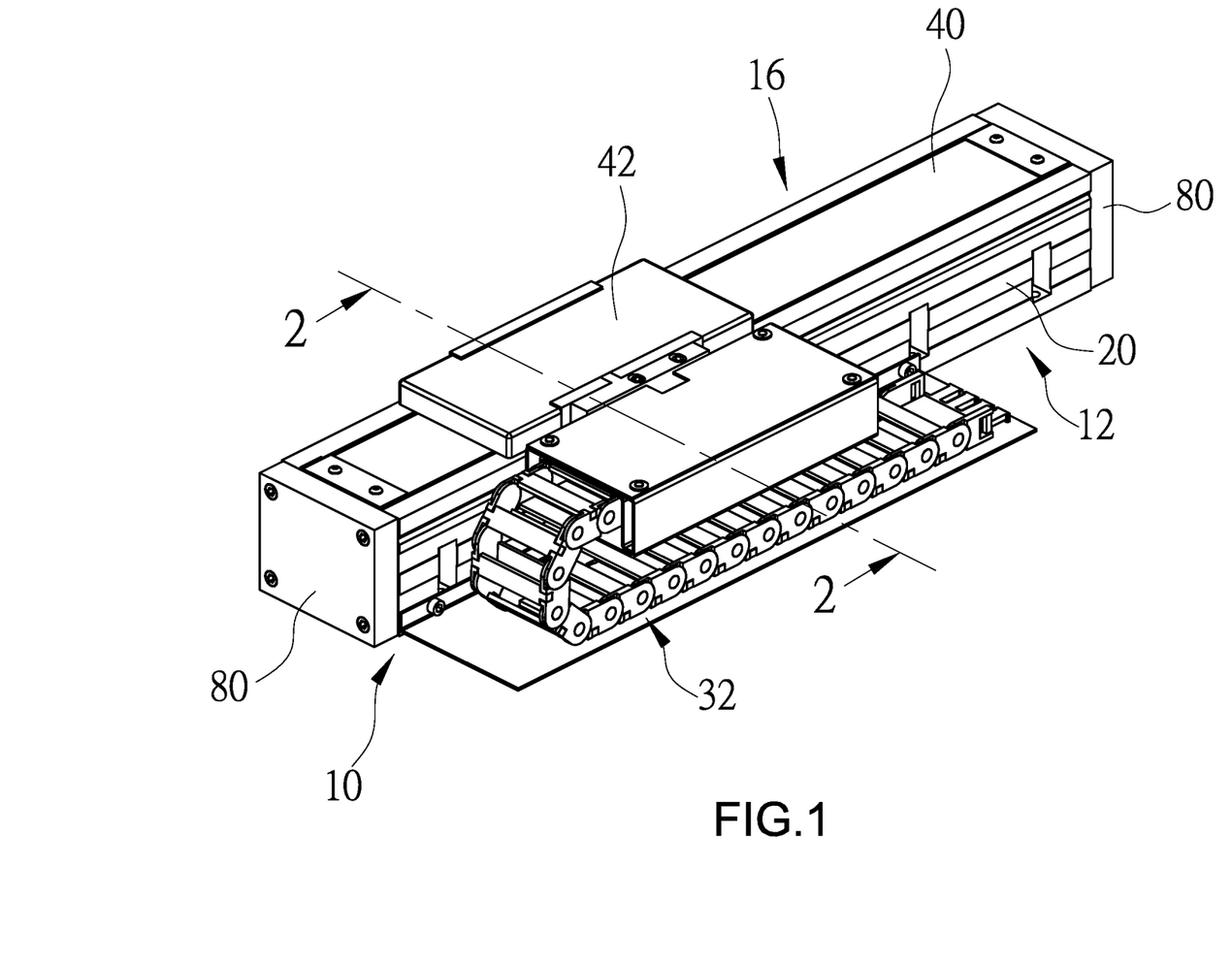
FIG. 1 is a perspective view of a slide apparatus in accordance with an embodiment of the present invention.
Figure 2:
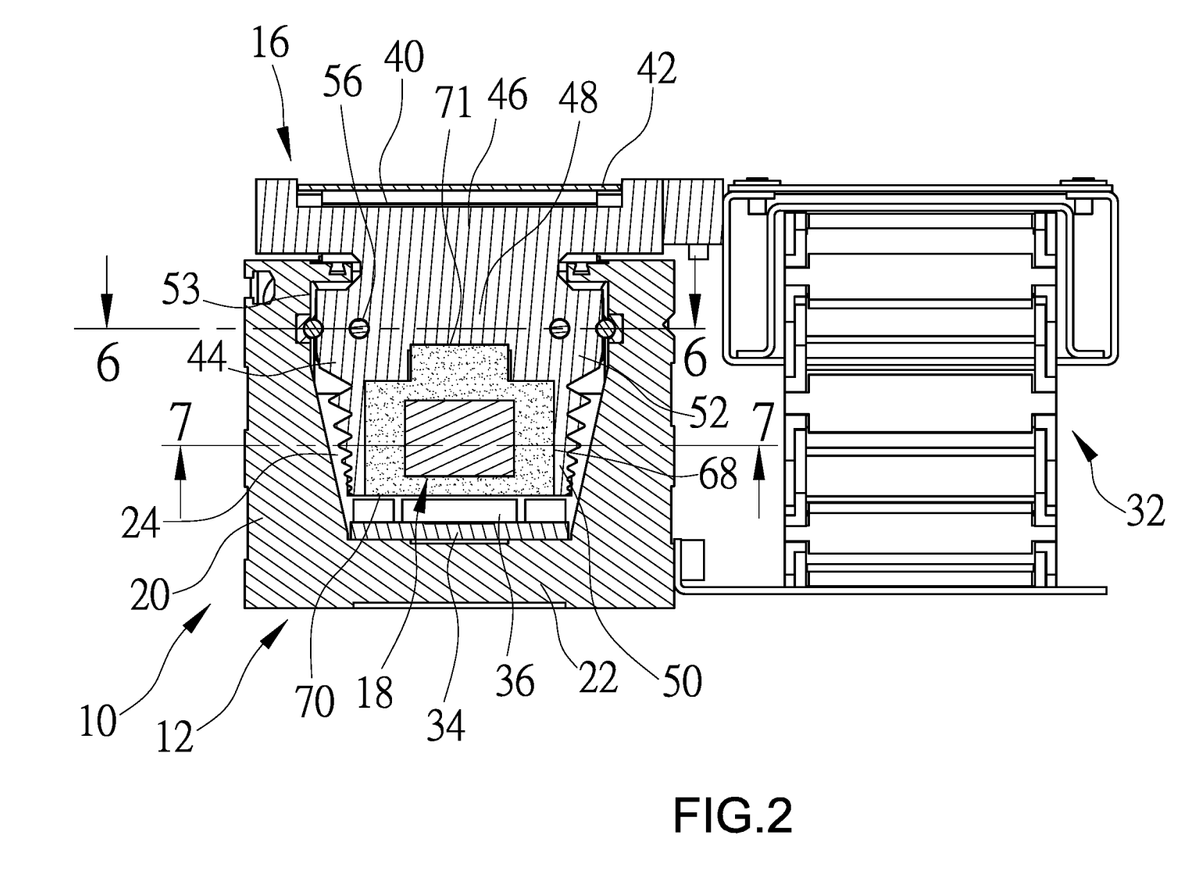
FIG. 2 shows a sectional view taken along line 2-2 in FIG. 1.
Figure 3:
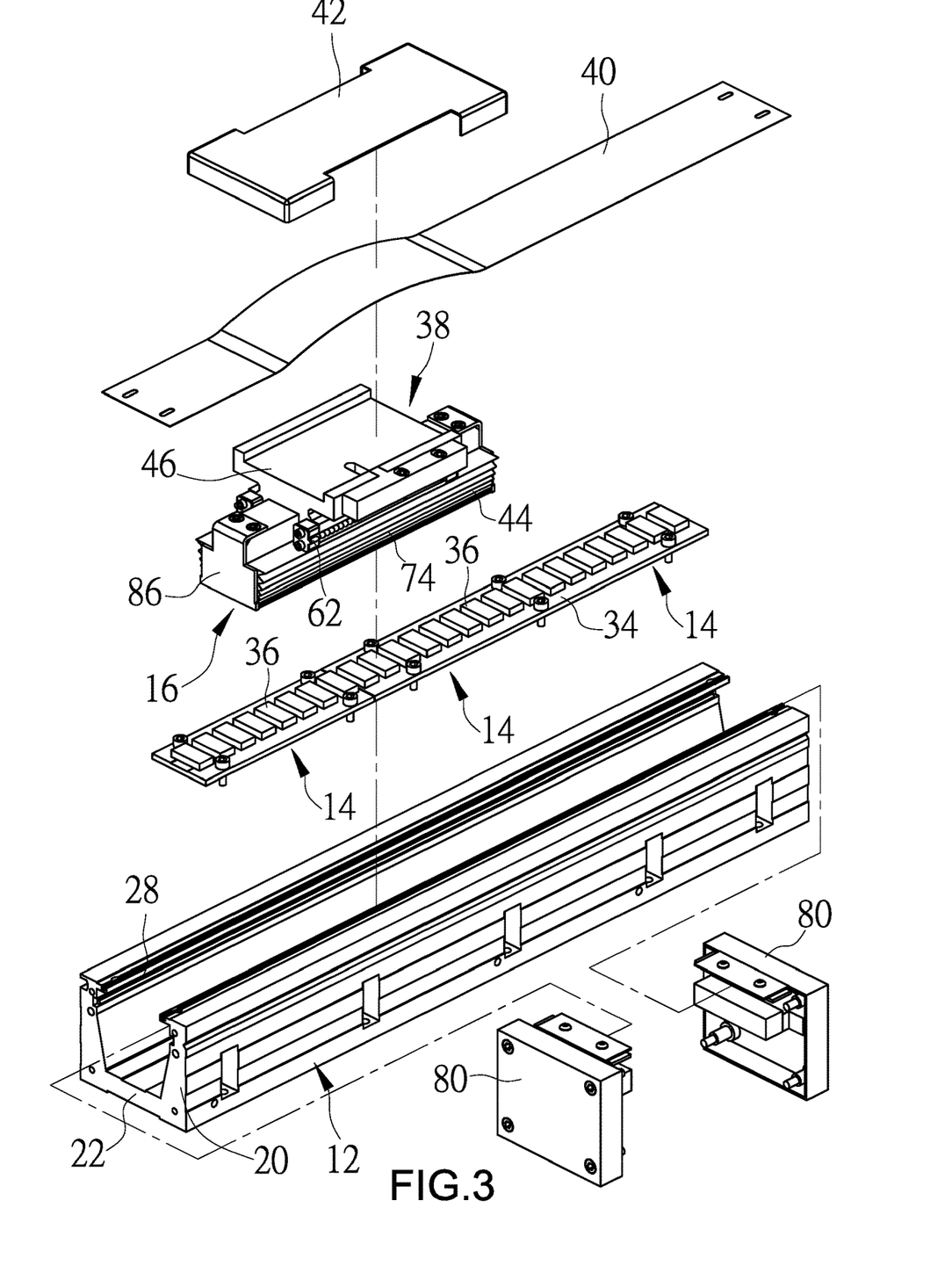
FIG. 3 shows a partially exploded view of the slide apparatus in FIG. 1.
Figure 4:
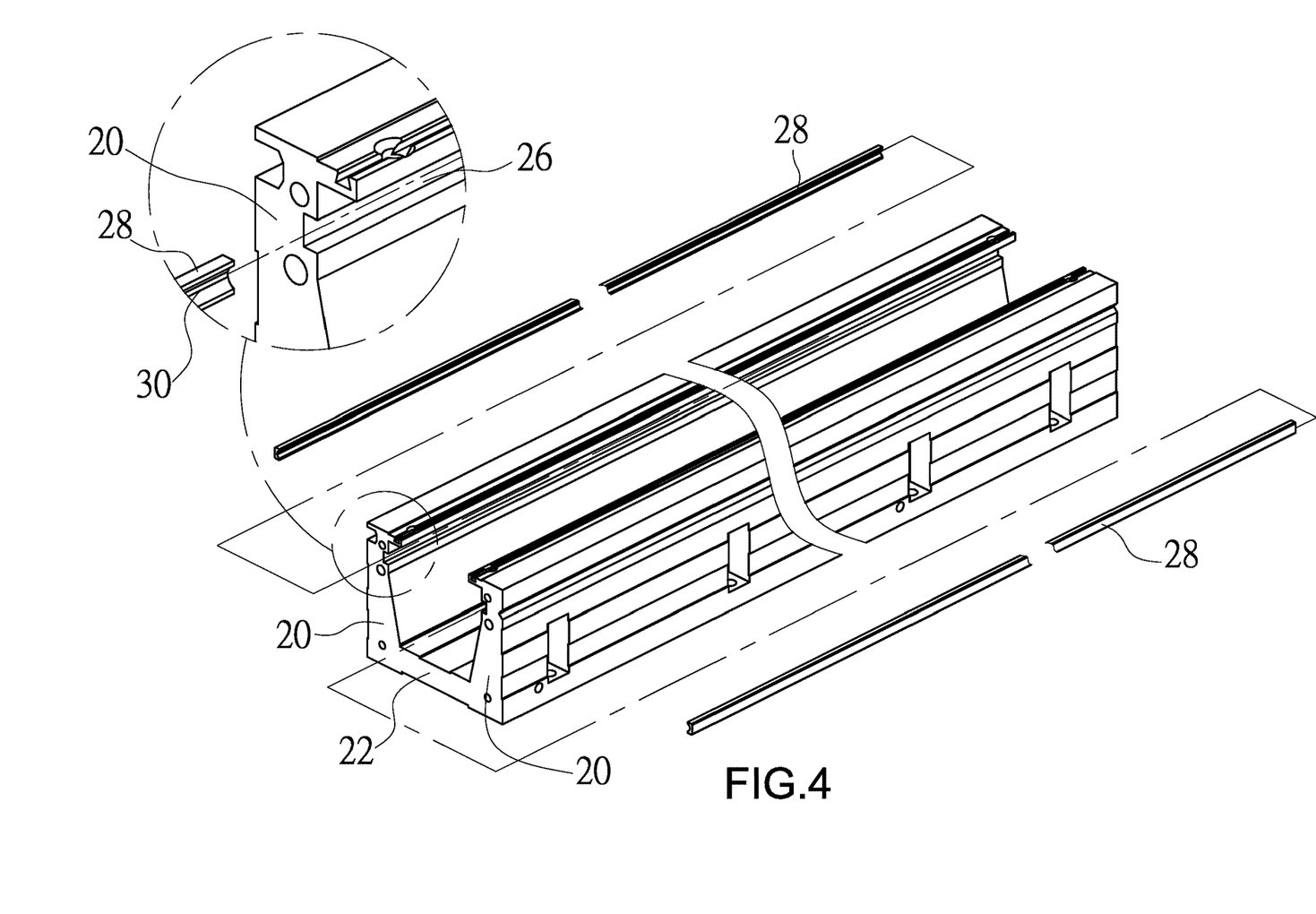
FIG. 4 shows an exploded view of a track body of the slide apparatus and an enlarged fragmentary view of a part circled in the exploded view.
Figure 5:
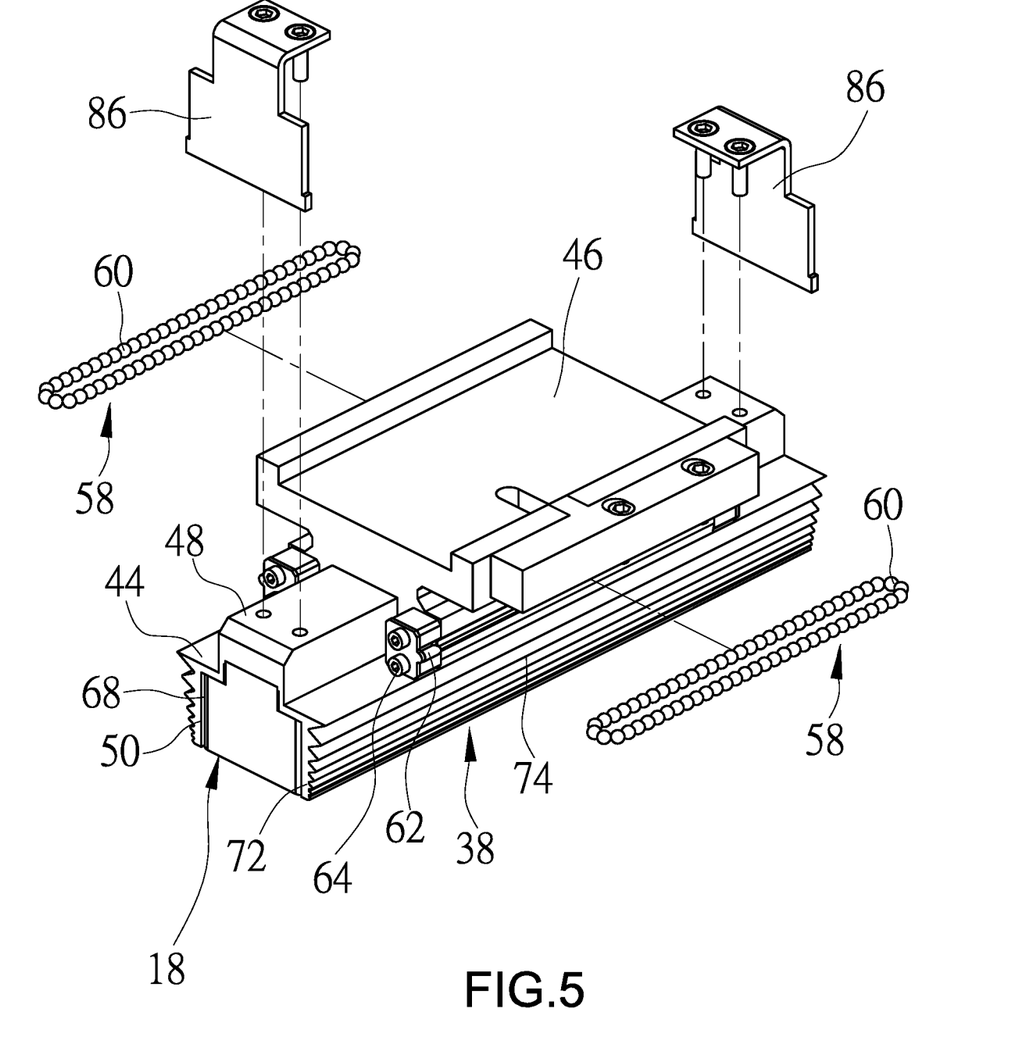
FIG. 5 shows a partially exploded view of a slider assembly of the slide apparatus in FIG. 1.
Figure 6:
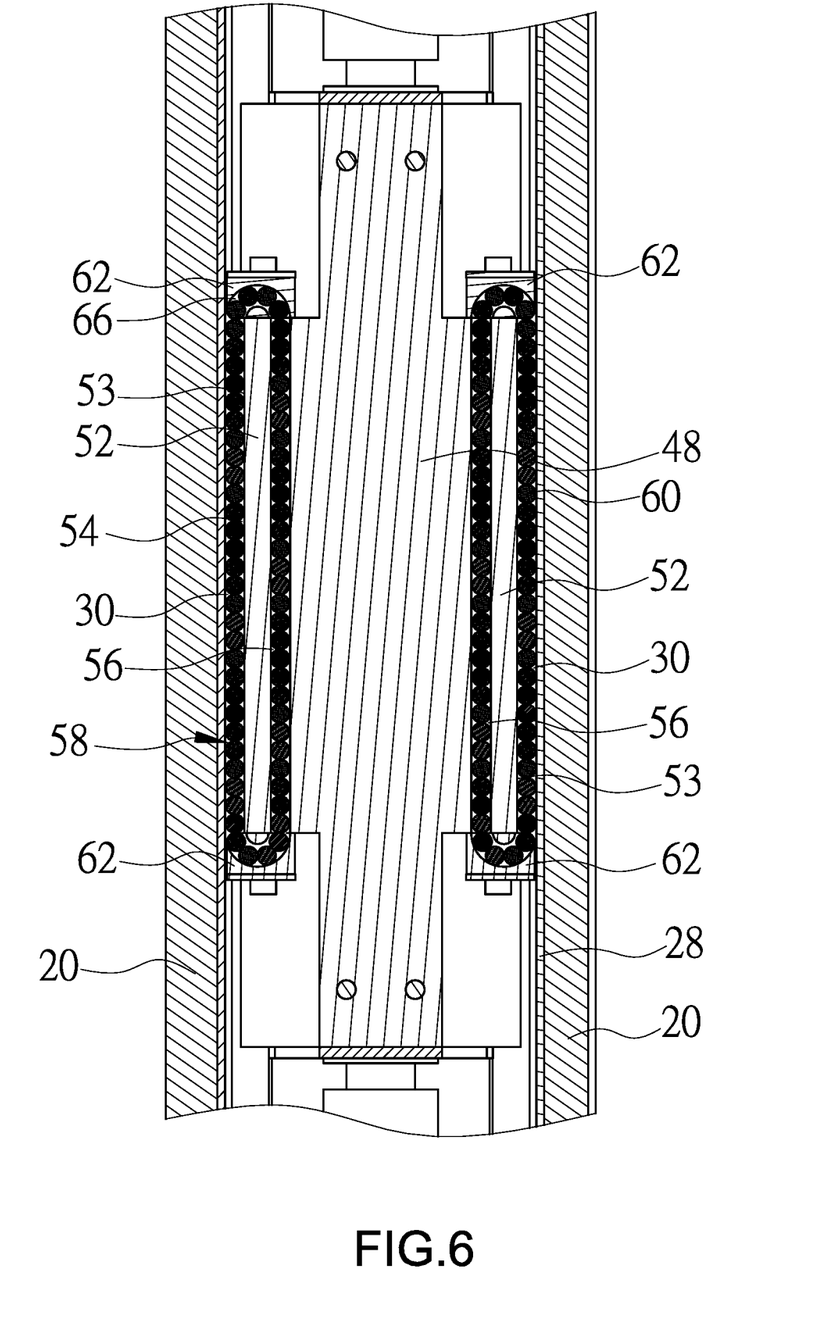
FIG. 6 shows a sectional view taken along line 6-6 in FIG. 1.
Figure 7:
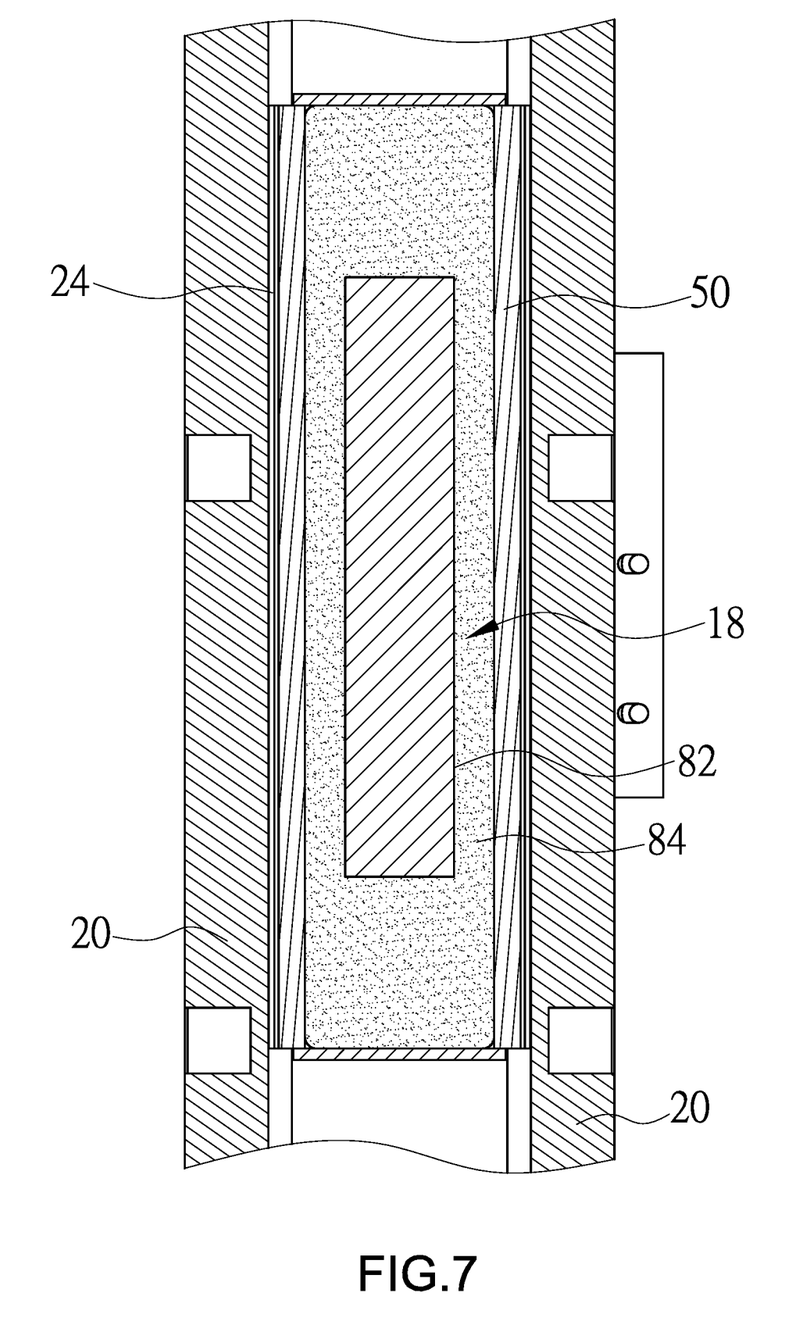
FIG. 7 shows a sectional view taken along line 7-7 in FIG. 1.
Figure 8:
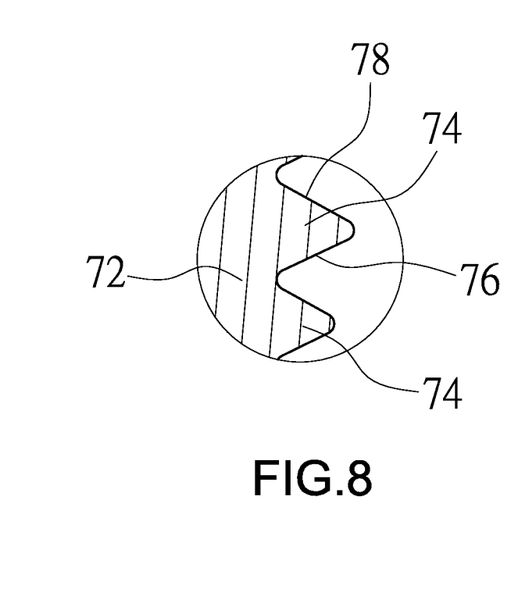
FIG. 8 shows an enlarged fragmentary view of one embodiment of radiating fins provided at the slider assembly.
Figure 9:
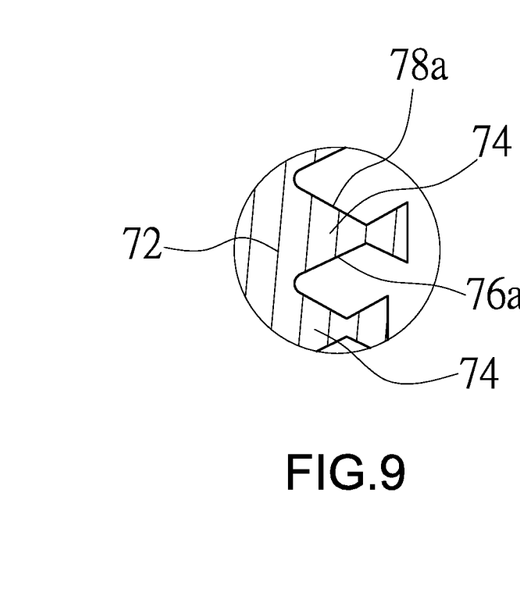
FIG. 9 shows an enlarged fragmentary view of another embodiment of radiating fins provided at the slider assembly.

The lower portion 50 of the housing 44 is provided with at least one channel 68 that opens out at a bottom opening 70 facing to the bottom 22 of the track body 12 (FIG. 2). In this embodiment, the channel 68 has a convex upper groove 71 with a smaller width in the transverse direction. Furthermore, the lower portion 50 of the housing 44 has two opposite walls 72 each provided with toothed radiating fins 74. Each radiating fin 74 has a first side 76 and a second side 78 (see FIG. 8), and each of the first and second sides 76 and 78 is configured as a bevel side. Alternatively, a curved side can also be configured for the first and second sides 76 and 78 of the radiating fin 74. In another embodiment, each radiating fin 74 has a first side 76a and a second side 78a (see FIG. 9), and each of the first and second sides 76a and 76b can be configured as a toothed or wavy side. Further, the slide apparatus 10 may further include an anti-dust tape 40, which extends along the longitudinal direction to pass over the platform 46 of the housing 44 and can be fixed on two opposite ends of the track body 12 to prevent dust from falling into the track body 12. The cover 42 is placed over the anti-dust tape 40 and joined with the platform 46. Furthermore, two end plates 80 can be respectively attached to the two opposite ends of the track body 12.

The second module 18 (commonly known as "rotor" or "mover") is received in the channel 68 of the housing 44 and formed integrally with the housing 44. The second module 18 can work with the first module 14 to function as a linear motor, which can drive the slider assembly 16 to move along the track body 12. The second module 18 is constructed of at least one set of coils 82 enclosed in a body 84 formed by an adhesive, such as epoxy resin, being filled into the channel 68 of the housing 44, so that the secondary module 18 is packaged into the channel 68 of the housing 44, and thus formed integrally with the housing 44. In addition, two sealing plates 86 can be used to seal two open ends of the housing 44. In use, when the set of coils 82 is energized, an electro-magnetic field can be generated, which can interact with the magnetic field of the permanent magnets 36 to force the slider assembly 16 to move along the track body 12. In this embodiment, the primary module 14 is made of permanent magnets 36 whereas the second module 18 is made of coils 82. However, in another embodiment, it is possible that a primary module is made of coils whereas a second module is made of permanent magnets.

As a summary, the slide apparatus 10 of the present invention has the following advantages and effects:

1. The channel 68 of the housing 44 of the slider 38 is designed as a jig for the secondary module 18 to facilitate the secondary module 18 formed integrally with the housing 44. Thus, an increase in the number of the slider 38 may increase the production efficiency of the secondary modules 18. In other words, the production efficiency of the secondary modules 18 is not limited by the number of jigs, and thus a required stock of the secondary module can be achieved easily. Besides, since the secondary module 18 is formed integrally in the slider 38, the problem of broken fasteners of conventional slide devices does not occur during acceleration or braking of the slider 38, thus increasing the service life of the slide apparatus 10.

2. The radiating fins 74 provided on the lateral opposite walls 72 can significantly reduce the temperature rise of the slide apparatus 10, and can serve as an excellent electromagnetic barrier.

3. Since the slider 38 is slidably mounted on the track body 12 via the two rail elements 28 embedded in the grooves 26 of the side walls 20 of the track body 12 instead of conventional rails and sliding blocks, the height and width of the slide apparatus 10 can be reduced significantly while maintaining the load capacity and accuracy of conventional slide devices.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A slide apparatus, comprising:
a track body having two side walls spaced apart in a transverse direction and a bottom formed between the two side walls, with a recessed space formed in the track body and between the two side walls and the bottom, with the recessed space extending in a longitudinal direction perpendicular to the transverse direction;
at least one primary module received in the recessed space of the track body;
a slider mounted on the track body and moveable along the track body, with the slider having a housing located in the recessed space of the track body and including an upper portion supported by the track body and a lower portion located between the upper portion and the bottom of the track body, with the lower portion of the housing defining a channel therein, with the channel including a bottom opening facing to the bottom of the track body, with the lower portion having two opposite walls spaced apart in the transverse direction and extending in the longitudinal direction, with each of the two opposite walls including inner and outer faces opposite in the transverse direction, with the channel defined between the inner faces of the two opposite walls, with the outer face of each of the two opposite walls facing one of the two side walls of the track body and provided with a plurality of radiating fins thereon; and at least one secondary module formed integrally in the channel of the housing of the slider and constructed of at least one set of coils enclosed in a body formed by an adhesive, wherein the set of coils is received in the channel of the housing of the slider, and the adhesive is filled in the channel, wherein the body formed by the adhesive is directly engaged with the inner faces of the two opposite walls, wherein the at least one secondary module works with the at least one primary module to constitute a linear motor, enabling the slider to move linearly along the track body.

2. The slide apparatus of claim 1, with the at least one primary module including a base plate fixed on the bottom of the track body and a plurality of magnets provided on the base plate.

3. The slide apparatus of claim 2, with each side wall of the track body including an inner surface provided with a rail element extending in the longitudinal direction perpendicular to the transverse direction and defining an elongated recess, with the upper portion having two opposite lateral sections each defining a groove in an outer surface thereof, with each groove being opposite to the elongated recess of a respective rail element to form a first passage, with the upper portion defining two second passages each corresponding to a respective groove thereof, wherein a ball chain constructed of a plurality of balls is fitted through a respective first passage and a respective second passage.

4. The slide apparatus of claim 3, with each radiating fin having a first side and a second side opposite to the first side, with each of the first and second sides configured as a bevel side or a curved side.

5. The slide apparatus of claim 3, with each radiating fin having a first side and a second side opposite to the first side, with each of the first and second sides configured as a toothed side or a wavy side.

6. The slide apparatus of claim 1, with each side wall of the track body including an inner surface provided with a rail element extending in the longitudinal direction perpendicular to the transverse direction and defining an elongated recess, with the upper portion having two opposite lateral sections each defining a groove in an outer surface thereof, with each groove being opposite to the elongated recess of a respective rail element to form a first passage, with the upper portion defining two second passages each corresponding to a respective groove thereof, wherein a ball chain constructed of a plurality of balls is fitted through a respective first passage and a respective second passage.

7. The slide apparatus of claim 6, with each radiating fin having a first side and a second side opposite to the first side, with each of the first and second sides configured as a bevel side or a curved side.

8. The slide apparatus of claim 6, with each radiating fin having a first side and a second side opposite to the first side, with each of the first and second sides configured as a toothed side or a wavy side.

9. The slide apparatus of claim 1, wherein the housing of the slider is provided with a platform formed at a top thereof and located above the track body.

* * * * *